United States Patent [19]

Pizzi et al.

[11] Patent Number: 5,532,330
[45] Date of Patent: Jul. 2, 1996

[54] HEAT-CURABLE TANNIN-BASED BINDING AGENTS

[75] Inventors: Antonio Pizzi, Epinal, France; Willi Roll, Altenberge; Berthold Dombo, Mönchengladbach, both of Germany

[73] Assignee: Rutgerswerke Aktiengesellschaft, Germany

[21] Appl. No.: 317,918

[22] Filed: Oct. 4, 1994

[30] Foreign Application Priority Data

Oct. 2, 1993 [DE] Germany ........................ 44 06 825.5
Oct. 13, 1993 [DE] Germany ........................ 43 34 962.5

[51] Int. Cl.$^6$ ............................................. C08G 67/00
[52] U.S. Cl. ........................ 528/125; 528/126; 524/799; 525/506
[58] Field of Search ............................. 528/125, 126; 524/799; 525/506

[56] References Cited

U.S. PATENT DOCUMENTS 3,615,788  10/1971  Kim et al. ........................ 106/74

FOREIGN PATENT DOCUMENTS 4554121  8/1986  Australia .
0536795  4/1993  European Pat. Off. .
61-062573  3/1986  Japan .

OTHER PUBLICATIONS

Journal of Macromolecular Science—Chemistry, vol. A16(7), pp. 1243–1250 (1981), Tannin Adhesives for Particleboard—European Search Report No. 94112177.4.

Meikleham et al, J. Appl. Polym. Sci. (1994), 54(12) 1827–45.

George, Joseph, "Tannin Adhesives for wood based panels," J. Indian Acad. Wood Sci. (1976), 7(1), 31–5.

*Primary Examiner*—James J. Seidleck
*Assistant Examiner*—Richard Lee Jones
*Attorney, Agent, or Firm*—Bierman and Muserlian

[57] ABSTRACT

A heat-curable, formaldehyde-free binding agent comprising a polyflavonoid type tannin and as a curing catalyst, a compound having a weak acid reaction curable at relatively high temperatures and compatible with cellulose containing materials such as wood chips for the production of particle boards.

9 Claims, No Drawings

HEAT-CURABLE TANNIN-BASED BINDING AGENTS

STATE OF THE ART

Tannin has been explored as a natural raw material capable of regeneration for the production of binding agents for wood products [J. Macromol. Sci.-Chem., A 16(7), pp. 1243–50 (1981)]. Their use has not been widespread despite their ready availability since the tensile strength of tannin-bound wood products is not satisfactory, especially after exposure to moisture.

In German application No. 43 28 220.8, there is described a heat-curable binding agent containing a tannin which is cured by addition of an agent capable of splitting off formaldehyde when exposed to heat to obtain wood products with good strength and low swelling values in water storage. However, these values are only obtained with tannin derived from pecan nuts. Moreover, if the dosage of the formaldehyde releasing agent is not exact, the formaldehyde can continue to be split off and continue to be released after the pressing process.

OBJECTS OF THE INVENTION

It is an object of the invention to provide novel binding agents based on tannin for the production of wood products with improved mechanical properties and which will split off formaldehyde to a reduced degree or not at all.

It is another object of the invention to provide improved cellulose-containing products with a heat-curable, formaldehyde-free binding agent and a process for its production.

These and other objects and advantages of the invention will become obvious from the following detailed description.

THE INVENTION

The novel heat-curable, formaldehyde-free binding agent of the invention is comprised of a polyflavonoid type tannin and as a curing catalyst, a compound having a weak acid reaction.

Compounds with weak acid reaction are inorganic acids or substances with an acid reaction in an aqueous environment with a pka value greater than 7.5. Example of such compounds are boric acid, aluminum trichloride, zinc dichloride, tin tetrachloride and silicon dioxide.

For example, pecan nut tannin extracts with a pH of 9.55 gels at room temperature after the addition of 6% by weight of $AlCl_3$ (pka=8.6) in 780 seconds, of $H_3BO_3$ (pka=9.2) in 360 seconds and $SiO_2$ (pka=10) within 49 seconds. The preferred binding agent is silicon dioxide in highly dispersed or crystalline form in an amount of up to 10% by weight, preferably 1% to 6% by weight.

Examples of suitable tannins of the polyflavonoid type are tannins of pecan nut, pinus radiata (pine), acacia mearnsii (mimosa) or schinopsis balansae (quebracho) alone or in mixtures thereof.

The binding agents are useful for the production of cellulose-containing products by mixing the said binding agent with a cellulose-containing product, especially Wood chips or spraying the cellulose-containing product with the binding agent, placing the resulting wetted cellulose-containing product in a mold and pressing the mixture at 150° to 210° C. at a pressure of 0.1 to 4 $MPa/mm^2$ to form the cellulose-containing product.

The cellulose-containing product formed with the formaldehyde-free, heat-curable binding agent has a tensile strength equal to that of phenol-resin bound materials.

A particular advantage of the binding agent of the invention is that the tannin can be used without a prior disintegration treatment such as usually described in the literature. For example, pecan nut tannin (carya illinoensis) which is a commercially available product as a tanning agent can be used.

The pH value for the production of a binding agent of the invention can be varied and curing can be accomplished in an acidic pH range such as <2 as well as in the alkaline range of >7.5. The adjustment of the pH value will influence the amount of the curing agent used, particularly with $SiO_2$, to achieve optimum curing.

For example, when 6% by weight of $SiO_2$ is added to a pecan nut tannin solution with a pH of 8.2, the resulting particle board shows a maximum tensile strength of 0.55 MPa after a relatively long pressing time of 7.5 minutes. In contrast thereto, if the same amount of $SiO_2$ is added at a pH of 10.2, the production of a particle board is not possible since the binding agents cure too rapidly at low temperatures. This means less $SiO_2$ has to be used with the reactive tannins at the higher pH value.

This is so pronounced that a DIN V 20 particle board produced with a pecan nut tannin at a pH value of 10.2 with the addition of 0.1 to 0.2% by weight of $SiO_2$ has a tensile strength of 0.71 MPa after a pressing time of 7.5 minutes. Even if the pressing time is reduced to 2 minutes (10 seconds/mm.), the particle board still has a tensile strength of 0.41 MPa so these values are still satisfactory for V 20 particle boards.

The results are somewhat different when less reactive tannins are used. For example, particle boards wherein the sole binding tannin is from mimosa (acacia mearnsii), have a tensile strength only about 39% of that of a pecan nut tannin particle board. By using about 3% by weight of $SiO_2$, the resulting tensile strength meets the requirements of V 20 particle boards.

Tannins from pine bark (pinus radiata) are per se less active, but when they are mixed with pecan nut tannin, they show in the presence of the $SiO_2$ curing catalyst sufficient reactivity for use as binding agent for cellulose-containing products. The addition of 10% by weight of pecan nut tannin is already sufficient for industrial application. However, those mixtures are preferably suitable in which the weight ratio of pecan nut tannin to pine tannin is 30:70 to 50:50. With mixtures of this type, pressing times of 10 seconds/mm. can be achieved.

At a ratio of the mixture of 30:70 to 25:75 parts by weight of pecan nut tannin to pine tannin, satisfactory results in the production of V 20 boards are achieved. However, shorter pressing times can also be achieved with mixture ratios between 25:75 to 40:60. Similar results were obtained with the rather less active tannin of quebracho.

The investigations with binding agents of the invention show overall that in comparison with urea-formaldehyde binding agents, it is possible to work with significantly lower concentrations of the binding agent, and that the pressing times decrease considerably by using higher concentrations of the binding agent.

For the production of cellulose-containing bound products, the tannins or the tannin mixture is adjusted to the desired pH-value, mixed with the compound having weak acid reactions, particularly with $SiO_2$ which can be used in crystalline or highly dispersed form and the cellulose-containing products before these are pressed to form the appropriate materials.

For binding agents based on less reactive tannins and to achieve short pressing time, up to 10 percent by weight, preferably 1 to 6% by weight, of the compound having weak acid reactions is used. Additions greater than 10% by weight of the curing catalyst were not found to be useful since no further improvements can be achieved thereby.

Appropriate cellulose-containing products are, for example, wood veneer, wood chips, fibers based on cellulose or also straw from which particle boards, plywood or sound and head insulation boards are produced.

The production of the materials takes place in such a way that the binding agents of the invention are mixed with cellulose-containing products, the mixture is placed into a mold and cured under pressure at a temperature below the decomposition temperature of the tannin, preferably at 150° to 210° C. Depending on the material used and the desired density, the pressure is in the range of 0.1 to 4 MPa/mm$^2$. The production of three-layer particle boards is also possible for example at a pressure of 2 to 3.5 MPa/mm$^2$.

Depending on the desired material and desired strength, the amount of the binding agent is in the range of 4 to 20% by weight, based on the cellulose-containing product. The binding agent can be present as a solution of the components in water, alcohol or in a water-alcohol mixture.

In the following examples, there are described several preferred embodiments to illustrate the invention. However, it is to be understood that the invention is not intended to be limited to the specific embodiments.

EXAMPLE 1

The following Tables show the use of the binding agent of the invention for the production of particle boards using highly dispersed SiO$_2$ (Aerosil$^R$ 200) as the curing accelerator. Wood chips were sprayed with an aqueous-alcohol solution containing 11% by weight of the binding agent, based on the weight of the wood chips used, and were dried. They were then formed in a manner known per se (2.5 N/mm$^2$; 195° C.) into boards having the dimension 400× 350×12 mm, pressed and cured.

TABLE 1

Effect of the amount of SiO$_2$ on pecan nut tannin as the binding agent for particle boards having a thickness of 12 mm at a pH of 8.2 and a pressing time of 7.5 minutes.

| % SiO$_2$ | Transverse tensile strength (dry) [MPa] | Density [g/cm$^3$] | Moisture [%] |
|---|---|---|---|
| 0 | 0.230 | 0.706 | 13 |
| 3 | 0.329 | 0.702 | 14 |
| 6 | 0.547 | 0.702 | 15 |
| 9 | 0.356 | 0.703 | 14 |
| 18 | 0.343 | 0.700 | 22 |

TABLE 2

Effect of the amount of SiO$_2$ on mimosa tannin as the binding agent for particle boards having a thickness of 12 mm at a pH of approximately 10 and a pressing time of 7.5 minutes.

| % SiO$_2$ | Transverse tensile strength (dry) [MPa] | Density [g/cm$^3$] | Moisture [%] |
|---|---|---|---|
| 0 | 0.160 | 0.699 | 20 |
| 3 | 0.475 | 0.698 | 18 |
| 6 | 0.449 | 0.699 | 20 |
| 9 | 0.385 | 0.701 | 21 |

TABLE 3

Effect of the ratio of mixture of pecan nut tannin and pine tannin at a pH of 10.2 and a pressing time of 7.5 minutes on the properties of particle boards having a thickness of 12 mm.

| Pecan nut tannin [%] | Pine tannin [%] | Transverse tensile strength (dry) [MPa] | Density [g/cm$^3$] | Moisture [%] |
|---|---|---|---|---|
| 100 | 0 | 0.710 | 0.705 | 21 |
| 50 | 50 | 0.530 | 0.704 | 22 |
| 40 | 60 | 0.555 | 0.705 | 22 |
| 30 | 70 | 0.590 | 0.699 | 22 |
| 20 | 80 | 0.535 | 0.704 | 22 |
| 10 | 90 | 0.450 | 0.704 | 22 |
| 0 | 100 | 0.185 | 0.698 | 17 |

Various modifications of the products and method of the invention may be made without departing from the spirit or scope thereof and it is to understood that the invention is intended to be limited only as defined in the appended claims.

What we claim is:

1. A heat-curable, formaldehyde-free binding agent comprising at least one polyflavonoid tannin selected from the group consisting of tannins of pecan nut, pinus radiata, acacia mearnsii (mimosa), schinopsis and balansae (quebracho) and as a curing catalyst, a compound having a weak acid reaction.

2. A binding agent of claim 1 wherein the catalyst is SiO$_2$.

3. A binding agent of claim 1 wherein the curing catalyst is boric acid.

4. A binding agent of claim 1 wherein the curing catalyst is up to 10% by weight of the binding agent.

5. A binding agent of claim 1 wherein the curing catalyst is 1 to 6% by weight of the binding agent.

6. A binding agent of claim 2 wherein the pH value thereof is 0 to 2.

7. A binding agent of claim 2 wherein the pH value thereof is 7.5 to 14.

8. A cellulose-containing product containing a heat-curable, formaldehyde-free binding agent of claim 1.

9. A process for the production of cellulose-containing product of claim 9 comprising mixing a cellulose-containing material with a heat-curable binding agent based on at least one polyflavonoid tannin selected from the group consisting of tannins of pecan nut, pinus radiata, acacia mearnsii (mimosa), schinopsis and balansae (quebracho) and a curing catalyst having weak acid reactions, placing the resulting mixture in a mold and heating the mixture in the mold at 150° to 210° C. at a pressure of 0.1 to 4 MPa/mm$^2$.

* * * * *